US012591474B2

(12) United States Patent
Grecco et al.

(10) Patent No.: US 12,591,474 B2
(45) Date of Patent: Mar. 31, 2026

(54) BATCH SCHEDULING FUNCTION CALLS OF A TRANSACTIONAL APPLICATION PROGRAMMING INTERFACE (API) PROTOCOL

(71) Applicant: Intel Corporation, Santa Clara, CA (US)

(72) Inventors: Joseph Grecco, Saddle Brook, NJ (US); Mukesh Gangadhar Bhavani Venkatesan, Bangalore (IN); Hariharan M, Palakkad (IN)

(73) Assignee: INTEL CORPORATION, Santa Clara, CA (US)

( * ) Notice: Subject to any disclaimer, the term of this patent is extended or adjusted under 35 U.S.C. 154(b) by 587 days.

(21) Appl. No.: 17/954,966

(22) Filed: Sep. 28, 2022

(65) Prior Publication Data

US 2023/0026206 A1     Jan. 26, 2023

(51) Int. Cl.
*G06F 9/54*          (2006.01)
(52) U.S. Cl.
CPC ................................... *G06F 9/546* (2013.01)
(58) Field of Classification Search
CPC .. G06F 9/546; G06F 2209/548; G06F 9/4843; G06F 9/547
See application file for complete search history.

(56) References Cited

U.S. PATENT DOCUMENTS

2022/0114270 A1*  4/2022  Wang ..................... G06F 9/5027
2022/0374294 A1*  11/2022  van der Merwe .... G06F 9/4812

OTHER PUBLICATIONS

GeeksforGeeks, "Remote Procedure Call (RPC) in Operating System", May 31, 2022, https://www.geeksforgeeks.org/remote-procedure-call-rpc-in-operating-system/ [retrieved Nov. 29, 2022], 7 pages.
GeeksforGeeks, "What is RPC Mechanism in Distributed System?", Mar. 19, 2022, https://www.geeksforgeeks.org/what-is-rpc-mechanism-in-distributed-system/ [retrieved Nov. 29, 2022], 6 pages.

(Continued)

*Primary Examiner* — Sisley N Kim
(74) *Attorney, Agent, or Firm* — JAFFERY WATSON HAMILTON & DESANCTIS LLP

(57) ABSTRACT

Embodiments described herein are generally directed to improving performance of a transactional API protocol by batch scheduling data dependent functions. In an example, a prescribed sequence of function calls associated with a transactional application programming interface (API) is received that is to be carried out by an executer (e.g., a compute service or a second processing resource remote from a first processing resource with which an application is associated) to perform an atomic unit of work on behalf of the application. Transport latency over an interconnect between the application and the executer is reduced by: (i) creating a batch representing the prescribed sequence of function calls in a form of a list of function descriptors in which variable arguments of the prescribed sequence of function calls are replaced with corresponding global memory references; and (ii) transmitting the batch via the interconnect as a single message.

20 Claims, 7 Drawing Sheets

(56) References Cited

OTHER PUBLICATIONS

IBM Corporation, "Batching Remote Procedure Calls", IBM Documentation, AIX, 7.2, Feb. 7, 2022, https://www.ibm.com/docs/en/aix/7.2?topic=features-batching-remote-procedure-calls [retrieved Nov. 29, 2022], 2 pages.

IBM Corporation, "RPC Features", IBM Documentation, AIX, 7.2, Aug. 10, 2022, https://www.ibm.com/docs/en/aix/7.2?topic=call-rpc-features [retrieved Nov. 29, 2022], 2 pages.

Williams, Lawrence, "Remote Procedure Call (RPC) Protocol in Distributed System", Nov. 12, 2022, https://www.guru99.com/remote-procedure-call-rpc.html [retrieved Nov. 29, 2022], 13 pages.

* cited by examiner

200
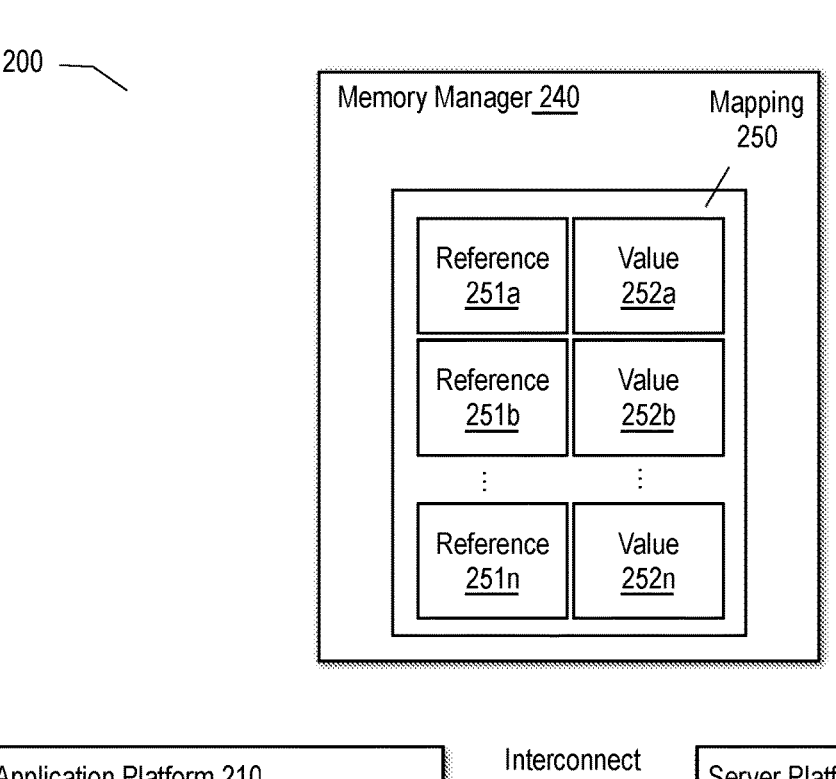
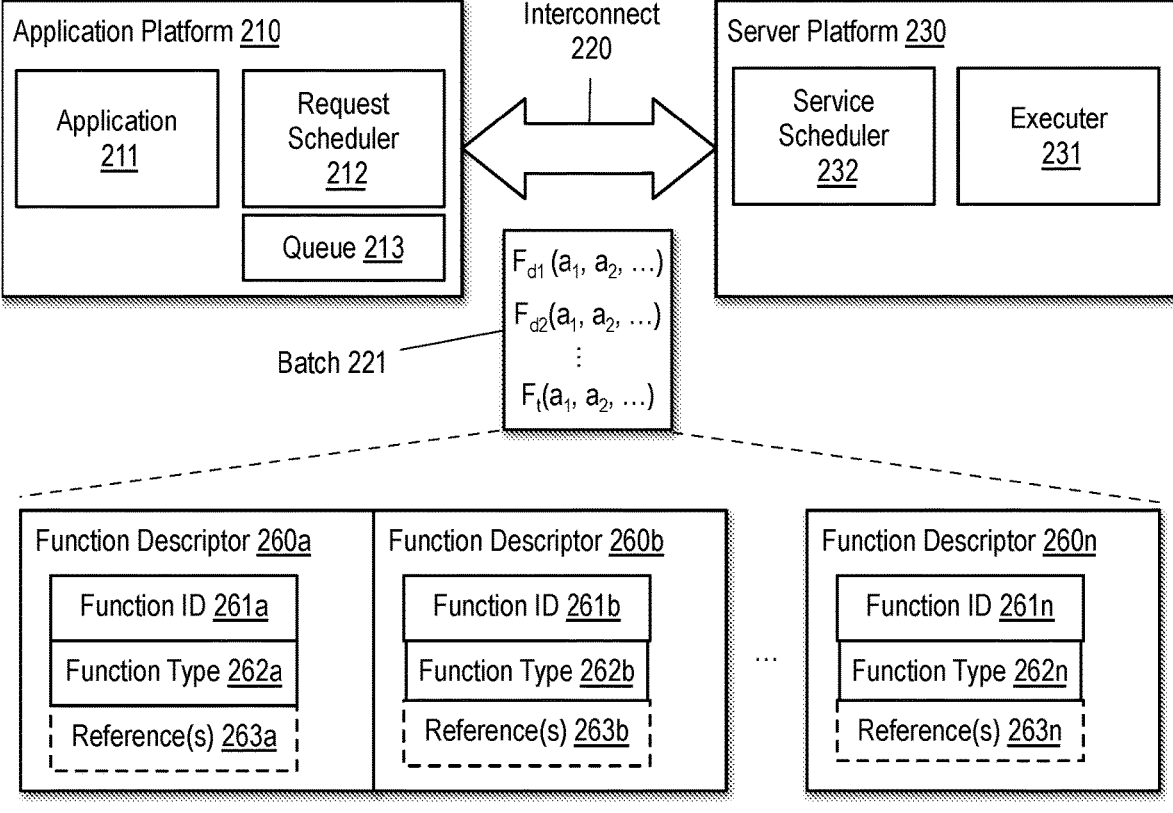
*FIG. 2A*

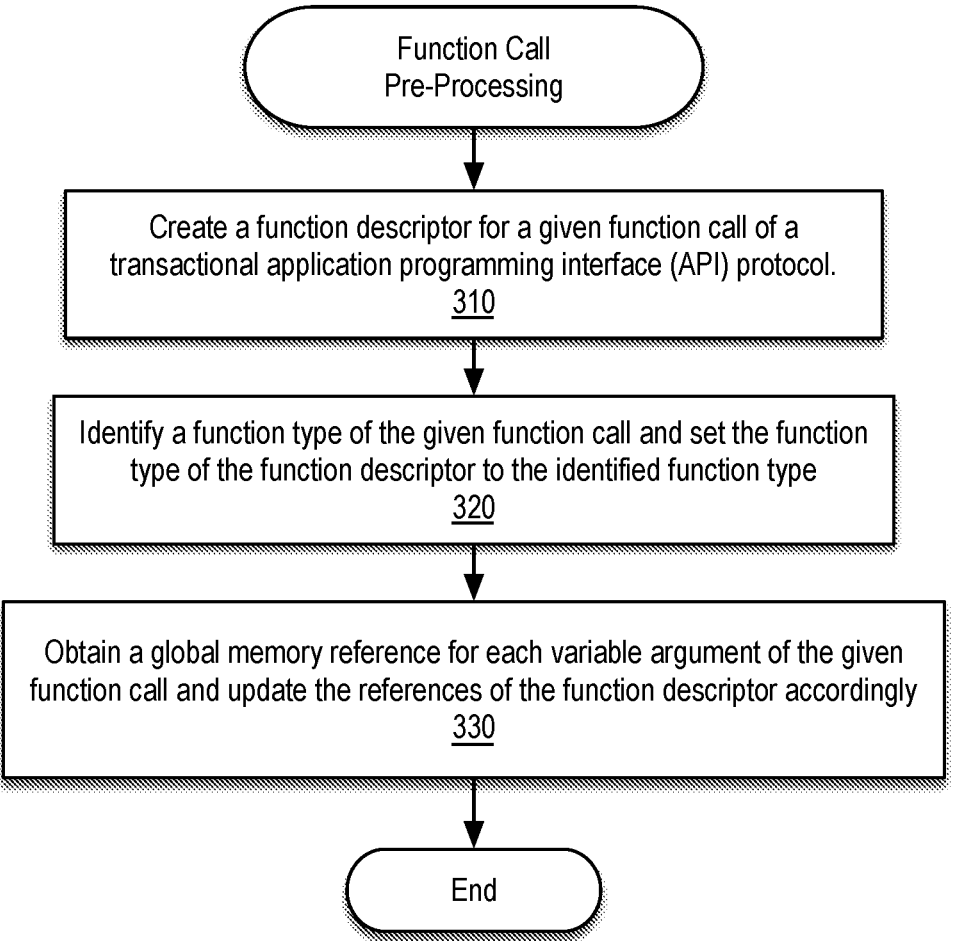

Function Call
Pre-Processing

Create a function descriptor for a given function call of a
transactional application programming interface (API) protocol.
310

Identify a function type of the given function call and set the function
type of the function descriptor to the identified function type
320

Obtain a global memory reference for each variable argument of the given
function call and update the references of the function descriptor accordingly
330

End

*FIG. 3*

BATCH SCHEDULING FUNCTION CALLS OF A TRANSACTIONAL APPLICATION PROGRAMMING INTERFACE (API) PROTOCOL

TECHNICAL FIELD

Embodiments described herein generally relate to the field of remote procedure call (RPC) technology and, more particularly, to improving performance of a transactional application programming interface (API) protocol by batch scheduling data dependent functions.

BACKGROUND

RPC is a software communication protocol that one program (e.g., an application) running on a client (e.g., an application platform) can use to request a service from a remote compute resource (e.g., a central processing unit (CPU), a graphics processing unit (GPU), application-specific integrated circuit (ASIC), or a field-programmable gate array (FPGA)), which may be referred to herein as an executer.

A transactional API protocol generally represents an interface scheme that makes use of RPCs (which may be referred to herein as function calls) in which performance of an atomic unit of work involves invoking a prescribed sequence of function calls. A transactional API may be implemented in the form of various types of RPC platforms or frameworks, including representational state transfer (REST), gRPC, and graph query language (GraphQL).

BRIEF DESCRIPTION OF THE DRAWINGS

Embodiments described here are illustrated by way of example, and not by way of limitation, in the figures of the accompanying drawings in which like reference numerals refer to similar elements.

FIG. 2A is a block diagram illustrating an operational environment supporting batch scheduling of function calls of a transactional API protocol according to some embodiments.

FIG. 3 is a flow diagram illustrating operations for performing function call pre-processing according to some embodiments.

DETAILED DESCRIPTION

Embodiments described herein are generally directed to improving performance of a transactional API protocol by batch scheduling data dependent functions. As illustrated by the example described below with reference to FIGS. 1A-B, invoking multiple function calls of a transactional API protocol over a network or other high-latency interconnect in order to have a unit of work performed remotely, introduces undesirable latency and network resource usage.

Figure 1A:
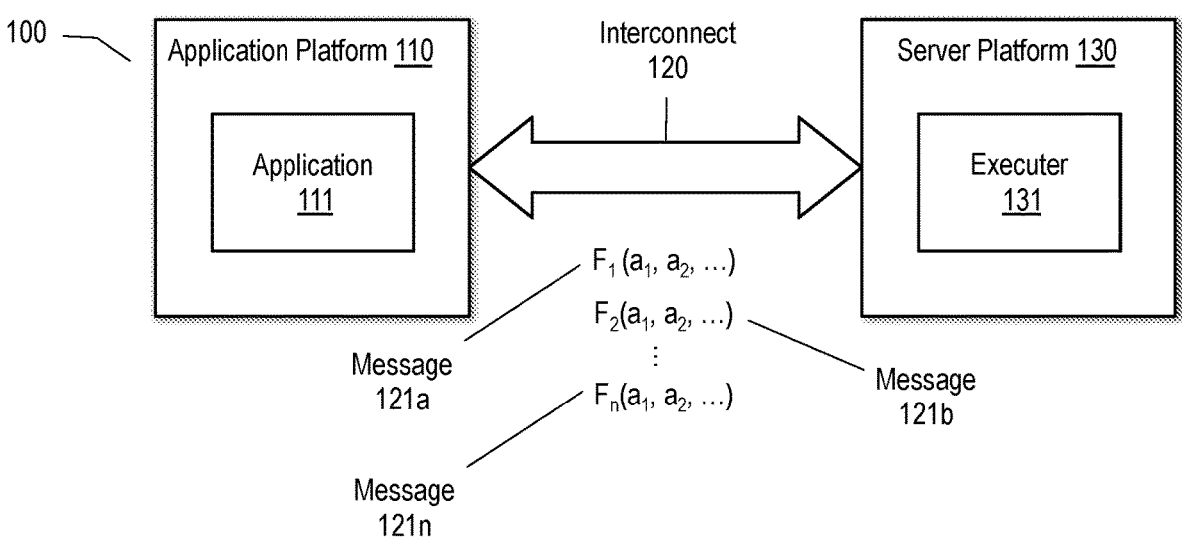
FIG. 1A is a block diagram illustrating actors involved in a transactional API protocol.

FIG. 1A is a block diagram illustrating actors involved in a transactional API protocol. In the context of FIG. 1A, an application platform 110 and a server platform 130 are coupled via an interconnect 120. The application platform 110 may represent a first computer system and the server platform 130 may represent a second (remote) computer system. Alternatively, the application platform 110 may represent a first compute resource (e.g., a CPU) of a computer system and the server platform 130 may represent a second compute resource (e.g., a GPU) on the same computer system. In the case of the former, the interconnect 120 may represent a network. In the case of the latter, the interconnect 120 may represent a peripheral component interconnect express (PCIe) bus. In either case, the interconnect 120 typically represents a performance bottleneck as the transport latency is relatively higher than as compared to communications performed within the application platform 110 or within the server platform 130.

An application 111 running on the application platform originates function calls and an executer 131 within the server platform 130 performs the work associated with the function calls. In the context of the present example, it is assumed an atomic unit of work is performed by the executer 131 responsive to a prescribed sequence of function calls (i.e., $F_1(a_1, a_2, \ldots), F_2(a_1, a_2, \ldots), \ldots F_n(a_1, a_2, \ldots)$) of a transactional API protocol originated by the application 111, in which each function call is sent across the interconnect 120 via a separate message (i.e., message 121a, 121b, and 121n, respectively).

Figure 1B:
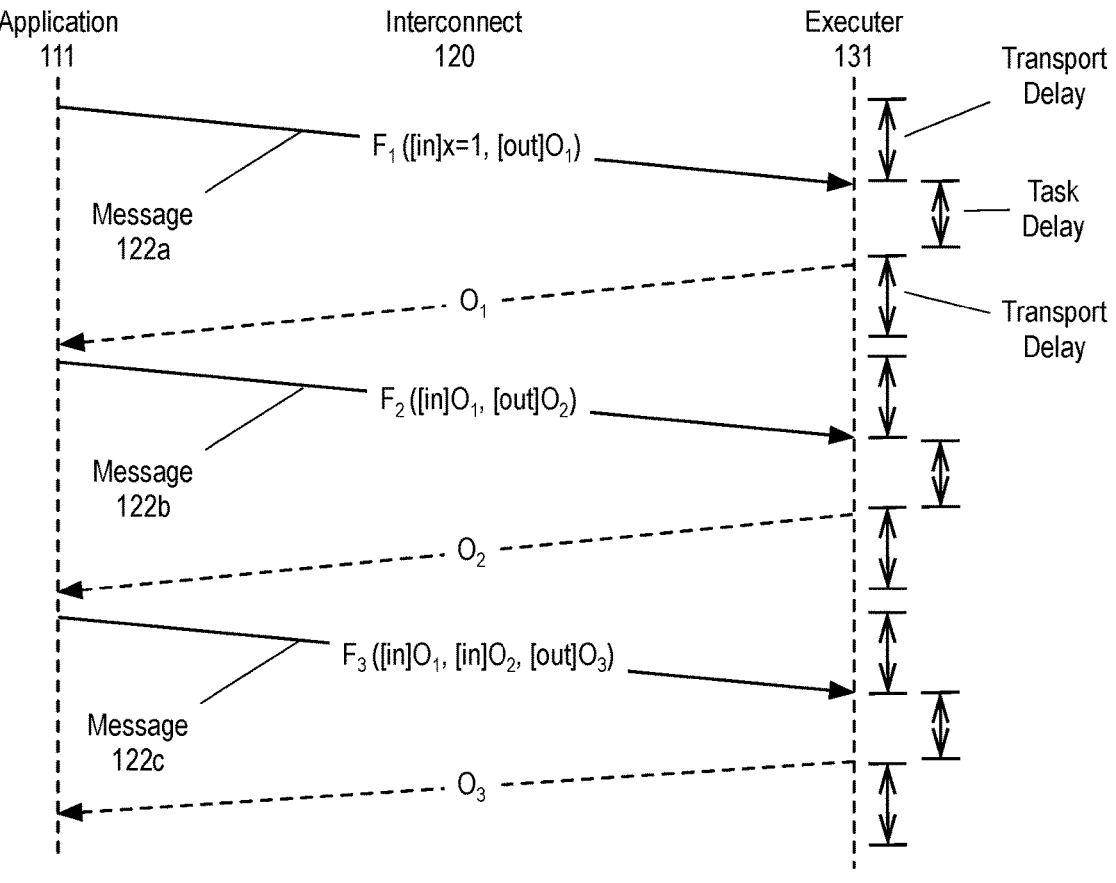
FIG. 1B is a message sequence diagram illustrating delays incurred in connection with an exchange of messages of a transactional API protocol between an application and an executer.

FIG. 1B is a message sequence diagram illustrating delays incurred in connection with an exchange of messages of a transactional API protocol between an application (e.g., application 111) and an executer (e.g., executer 131). In the context of the present example, an ordered sequence of function calls ($F_1$, $F_2$, and $F_3$) is originated by the application and sent via the interconnect 120 to the executer. Message 122a (which may be analogous to message 121a) represents a request on behalf of the application for the executer to remotely execute a function ($F_1$). $F_1$ includes two arguments, an immediate input passed as a literal constant and an output variable argument ($O_1$). Similarly, message 122b (which may be analogous to message 121b) represents a request on behalf of the application for the executer to remotely execute a function ($F_2$). $F_2$ includes two arguments, an input variable argument ($O_1$) and an output variable argument ($O_2$). Likewise, message 122c (which may be analogous to message 121c) represents a request on behalf of the application for the executer to remotely execute a function ($F_3$). $F_3$ includes three arguments, an input variable argument ($O_1$), an input variable argument ($O_2$), and an output variable argument ($O_3$).

In this example, it can be seen that $F_2$ has a dependency on the output $O_1$ from the preceding $F_1$ call. Similarly, $F_3$ is dependent on $F_1$ and $F_2$ for the values of 01 and $O_2$, respectively. Further assume that $O_3$ is the only output that the application cares about the value of (i.e., it is the result of the atomic work task). From this example, it can be seen, the transport API protocol incurs a transport delay for every function call. In addition, an interconnect bandwidth penalty is added for each output variable argument returned across the interconnect 120 that is not required by the application. In this case $O_1$ and $O_2$ are simply passed by to the Executer.

As can be seen from FIG. 1B, a significant source of latency and/or network utilization is the transport of the request/response data. Performance gains could be achieved if multiple functions could be sent in one message. This is a straight-forward task as long as all input arguments have known values. In many cases, however, particularly with stateful protocols, intermediate data may be needed from one function to be used as input to a subsequent function, making describing the functions more complicated.

Various embodiments described herein seek to improve the performance of transactional API protocols by batch scheduling multiple related function calls potentially having data dependencies, thereby reducing the transport delays incurred. As described further below, in one embodiment, a sequence of a multiple function calls associated with a transactional API protocol to be carried out by an executer on behalf of an application are received. Transport latency over an interconnect between the application and the executer is reduced by (i) creating a batch representing the multiple of function calls in a form of a list of multiple function descriptors in which variable arguments of the function calls are replaced with global memory references; and (ii) transmitting the batch via the interconnect as a single message. For example, the application may issue one function call after another and another component operable on the application platform may group those of the function calls that together represent a single work task as a batch.

To address the forward reference issue raised by a yet to be ascertained value of an output variable argument of one function of the prescribed sequence of multiple function calls potentially being used as an input to a subsequent function of the prescribed sequence, various embodiments make use of a memory manager that manages allocation and access to argument data storage via respective global memory references.

In one embodiment, an API-aware component operable on the application platform (e.g., the application itself or a library, supplied by the application platform or the transactional API protocol provider) makes use of its awareness of the transaction API protocol to facilitate the batching by classifying the type of functions associated with the respective function descriptors as dependent or terminating. A dependent function may represent a function that starts a prescribed sequence of multiple function calls or an intermediate function call of the prescribed sequence and a terminating function may represent a function that ends the prescribed sequence.

In the following description, numerous specific details are set forth in order to provide a thorough understanding of example embodiments. It will be apparent, however, to one skilled in the art that embodiments described herein may be practiced without some of these specific details.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, an "application" generally refers to software and/or hardware logic that originates function requests of a transactional API protocol.

As used herein, a "function descriptor" generally refers to a transmissible record describing a single function invocation of a transactional API protocol. A function descriptor may include one or more of a function identifier (ID) (e.g., a unique string representing the name of the function) corresponding to the command, a function type (e.g., dependent or terminating), and a global memory reference for each variable argument of the function.

As used herein, the phrase "global memory reference" generally refers to a token that identifies argument data storage. A given global memory reference uniquely identifies the same value on all platforms (e.g., an application platform and a server platform) on which it is used.

As used herein, an "executer" generally refers to software and/or hardware logic that performs the work described by a function descriptor. An executer may represent a compute service or resource remote from the application on behalf of which it performs the work.

As used herein, a "batch" generally refers to a list of function descriptors.

As used herein, an "interconnect" generally refers to any physical or logical mechanism for transmitting data suitable for implementing a function descriptor. Non-limiting examples of an interconnect include a network or a PCIe bus.

As used herein, the phrase "transactional API protocol" generally refers to an interface scheme that makes use of RPCs in which performance of an atomic unit of work involves invoking a prescribed sequence of function calls. This is in contrast to an interface that uses a single function to perform a work task. A transactional API may be implemented in the form of various types of RPC platforms or frameworks, including representational state transfer (REST), gRPC, and graph query language (GraphQL). Non-limiting examples of transactional API protocols include Intel oneAPI, compute unified device architecture (CUDA), and open computing language (OpenCL).

The terms "component", "platform", "system," "scheduler," "manager" and the like as used herein are intended to refer to a computer-related entity, either a software-executing general purpose processor, hardware, firmware, or a combination thereof. For example, a component may be, but is not limited to being, a process running on a compute resource, an object, an executable, a thread of execution, a program, and/or a computer.

Example Operational Environment

FIG. 2A is a block diagram illustrating an operational environment 200 supporting batch scheduling of function calls of a transactional API protocol according to some embodiments. In the context of the present example, the operational environment 200 is shown including an application platform 210, an interconnect 220, a server platform 230, and a memory manager 240. As above, the application platform 210 may represent a first computer system and the server platform 230 may represent a second (remote) computer system. Alternatively, the application platform 210 may represent a first compute resource (e.g., a CPU) of a computer system and the server platform 230 may represent a second compute resource (e.g., a GPU) on the same computer system. When the application platform 210 and the server platform 230 are separate computer systems, the interconnect 220 may represent a network. When the application platform 210 and the server platform 230 are within the same computer system, the interconnect 220 may represent a PCIe bus or a compute express link (CXL) interconnect. As explained above with reference to FIG. 1A, in either case, the interconnect 220 typically represents a performance bottleneck as the transport latency is relatively higher than as compared to communications performed within the application platform 210 or within the server platform 230.

The application platform 210 is shown including an application 211, a request scheduler 212, and a queue 213. The application 211 may represent software and/or hardware logic that originates function requests. The request scheduler 212 may insulate the application 211 from details associated with batch of sequences of function calls. Alternatively, the request scheduler 212 may be part of the application 210. The request scheduler 212 may be responsible for queuing function requests (e.g., function calls that start or represent intermediate function calls of a prescribed sequence of multiple function calls that are used together to perform an atomic unit of work) on the queue 213 and transmitting them as a batch (e.g., batch 221) along with the function call (e.g., a terminating function call) that ends the prescribed sequence to the service scheduler 232 via the interconnect 220. As shown in FIG. 2A, the batch 211 may be represented in the form of a list of function descriptors 260a-n each containing respective function IDs 261a-n, function types 262a-n.

The server platform 230 is shown including a service scheduler 232 and an executer 231. The executer 231 may represent software and/or hardware logic that performs the work described by a function descriptor. The service scheduler 232 may be responsible for scheduling the execution (replay) of the functions within a batch received from the request scheduler 212 by the executer 231. The service scheduler 212 may insulate the executer 231 from details associated with the notion of batches as well as the use of the memory manager 240 and global memory references. Alternatively, the service scheduler 232 may be part of the executer 231.

The memory manager 240 may represent software and/or hardware logic that manages allocation and access to memory based on a global memory reference. For example, the memory manger 240 may be used to get and set values (e.g., values 250a-n) for respective global memory references (e.g., references 251a-n) assigned by the memory manager 240. Each global memory reference may represent a token that uniquely (at least within a given batch) identifies data storage for a given variable argument of a function. For example, a mapping 250 (e.g., a key-value store or like data structure) may be used to map a given global memory reference to a given value. The global memory references may serve as place holders for the real values of input and/or output variable arguments of functions that are yet to be computed, thereby allowing an output variable argument of one function of a batch (e.g., batch 221) to be forward referenced by an input variable argument of subsequent function of the batch. The memory manager 240 may be implemented as a single centralized service (e.g., a microservice) or daemon or as multiple distributed components.

Figure 2B:
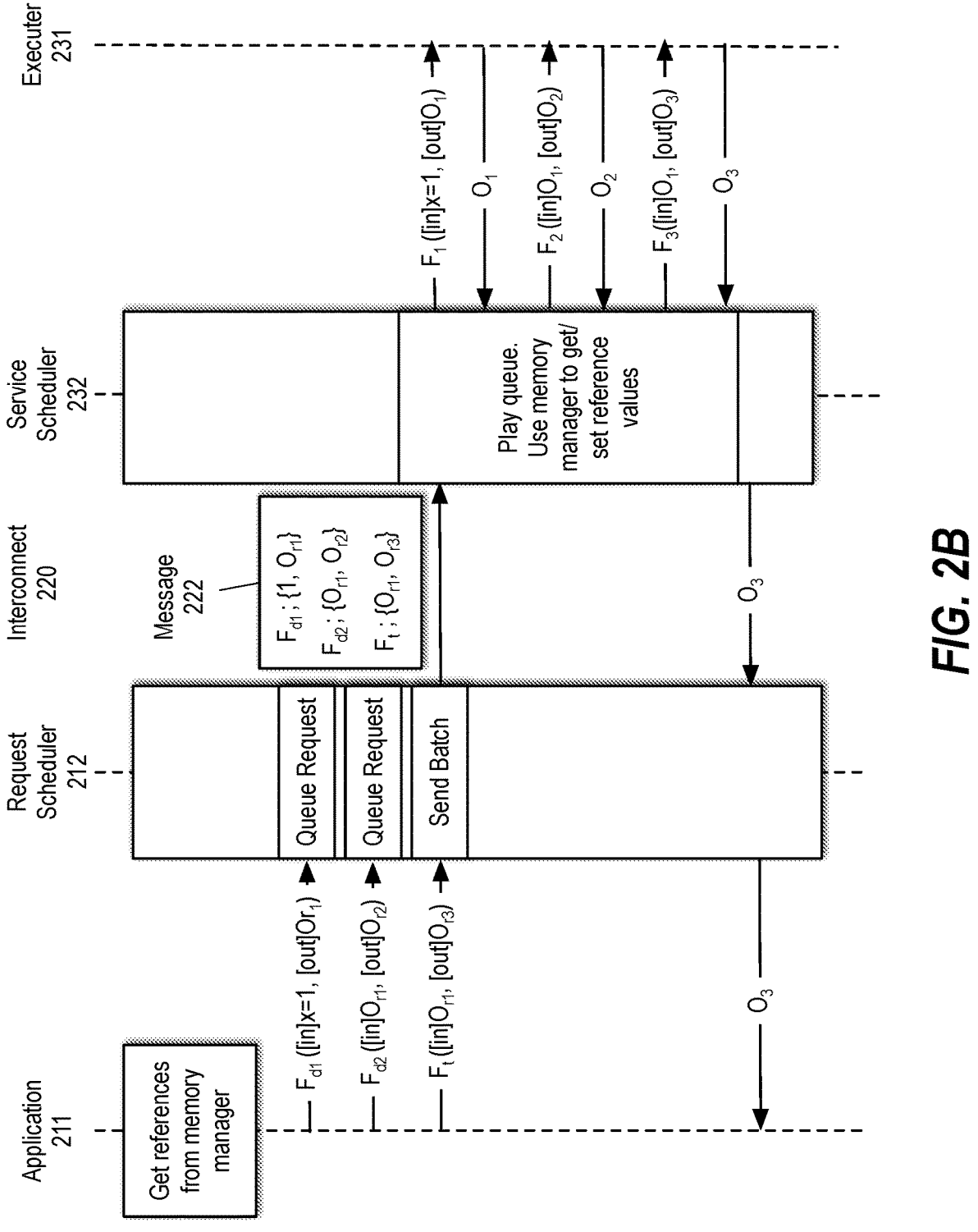
FIG. 2B is a message sequence diagram illustrating interactions among various actors involved in performing batch scheduling of multiple function calls of a transactional API protocol according to some embodiments.

FIG. 2B is a message sequence diagram illustrating interactions among various actors involved in performing batch scheduling of multiple function calls of a transactional API protocol according to some embodiments. The application 211 may use a function descriptor (e.g., one of function descriptors 260a-n) to describe each function request and its arguments. Arguments may be immediate or variable. Immediate arguments are inputs passed as literal constants. Variable arguments are arguments whose value can change after creation (e.g., as a result of a previous function request or in the case of an input buffer, by the application 211). Variable arguments may be further typed as input or output and are represented via respective global memory references, which are provided by a memory manager (e.g., memory manager 240).

In the context of the present example, the application 211 schedules a remote function by creating a function descriptor for the function to be invoked. Function call preprocessing performed by or on behalf of the application 211 may create references (e.g., global memory references) for all variable arguments. For variable input arguments, the application sets their respective values prior to sending the function request. Function descriptors may include a function ID, a function type, and all immediate and reference arguments (e.g., $O_{r1}$, $O_{r2}$, and $O_{r3}$). Function call preprocessing is described further below with reference to FIG. 3.

Responsive to receipt of function requests, the request scheduler 212 may perform request scheduling processing. The request scheduling processing may include delaying sending of function descriptors of dependent functions (e.g., $F_{d1}$ and $F_{d2}$) and a terminating function (e.g., $F_t$) until after receipt of the function descriptor of the terminating function at which point a batch including the function descriptors for an entire prescribed sequence may be transmitted to the service scheduler 232 via the interconnect 220 as a single message 222. Further description of request scheduling processing is described below with reference to FIG. 4.

When the service scheduler 232 receives the batch (e.g., message 222), it performs service scheduling processing. The service scheduling may include for each function descriptor in the batch, replacing reference arguments (e.g., $O_{r1}$, $O_{r2}$, and $O_{r3}$) with values provided by the memory manager. Upon conclusion of execution of a function descriptor by the executer 231, output data represented as references (e.g., $O_{r1}$, $O_{r2}$, and $O_{r3}$) are stored via the memory manager. Further description of service scheduling processing is described below with reference to FIG. 5.

In one embodiment, as a further optimization, the concept of a named batch may be utilized. In the previous example, the request scheduler 212 aggregates function descriptors into a batch and then transmits the contents of the batch to the service scheduler 232 for execution. A named batch allows a common sequence of function requests to be recorded or pre-defined and stored on the server platform 230. For example, each pre-defined batch may be associated with a symbolic name and a function descriptor. The function descriptor for a named batch may be limited to information regarding immediate arguments (e.g., $O_1$ and $O_2$) and the final output variable argument (e.g., $O_3$) of the function descriptor. The intermediate variable arguments may remain on the server platform 230 and thus may be invisible to the application 211.

The schedulers of FIG. 2A and the processing described below with reference to the flow diagrams of FIGS. 3-5 may be implemented in the form of executable instructions stored on a machine readable medium and executed by a processing or compute resource (e.g., a microcontroller, a microprocessor, a CPU, a CPU core, a GPU, a GPU core, an ASIC, an FPGA, or the like) and/or in the form of other types of electronic circuitry. For example, the processing may be performed by one or more virtual or physical computer systems of various forms, such as the computer system described below with reference to FIG. 6.

Example Function Call Pre-Processing

FIG. 3 is a flow diagram illustrating operations for performing function call pre-processing according to some embodiments. In one embodiment, function call pre-processing includes creation of a function descriptor for a given function call of a transactional API protocol prior to invocation of the given function call or as part of the invocation of the given function call by an application (e.g., application 211). The processing described with reference to FIG. 3 may be performed by an API-aware component. The API-aware component may be part of the application itself or may be a library or companion optimization plug-in supplied by an application platform (e.g., application platform 210) on which the application runs or supplied by the provider of the transactional API protocol.

At block 310, a function descriptor (e.g., function descriptor 260a) is created for the given function call. In one embodiment, the function descriptor represents a transmissible record describing invocation of the given function call and includes one or more of a function ID (e.g., function ID 261a), a function type (e.g., function type 262a), and one or more global memory references (e.g., references 263a). The function ID may be a unique string representing the name of the function or command to be carried out by the executer (e.g., executer 231). The function type may be one of multiple function types. The multiple function types may be indicative of whether the given function represents the start or an intermediate step (e.g., the given function call is a dependent function type) of a given prescribed sequence of function calls or the end (e.g., the given function call is a terminating function type) of the given prescribed sequence of function calls.

At block 320, a function type of the given function call is identified by the API-aware component and the function type of the function descriptor is set to the identified function type. In one embodiment, the API-aware component has knowledge of prescribed sequences of function calls of a transactional API protocol that may be batched together including which of the function calls are dependent and which are terminating. Alternatively or additionally, the API-aware component may apply a set of rules (e.g., including whether a function has an output argument whose value the application may have a dependency on) to classify and label a given function call as dependent or terminating within the function descriptor. Based on the knowledge of the prescribed sequences of function calls and/or the set of rules, the function type of the given function call may be identified from among the multiple function types.

At block 330, a global memory reference is obtained for each variable argument associated with the given function call and the references of the function descriptor are set to corresponding global memory references. For example, the API-aware component may loop through all arguments of the given function call and when the argument represents a variable arguments, the API-aware component may request a new global memory reference for the variable argument and include the new global memory reference within the function descriptor.

The following is a simplified and non-limiting example of a sequence of oneAPI Level-Zero API calls to copy a buffer. In this example it can be seen there are several dependencies. Note that the zeEventCreate function depends on the value of the event_pool, which is set via the prior zeEventPoolCreate call. Further the zeCommandListAppendMemoryCopy is dependent on the zeCommandListAppendMemoryCopy call, which is dependent on the kernel_event returned from zeEventCreate. Finally note that the application does not do anything with the values of event_pool or kernel_event other than to pass them to the dependent function. Therefore, this grouping of functions could be bundled into a Batch.

```
zeMemAllocDevice (context, &dev_desc,
    vectSize,
    1,
    pDevice,
    reinterpret_cast<void**> (&devptr));
status=zeMemAllocHost (context,
    &host_desc,
    vectSize,
    1,
    & fwhostptr);
status=zeEventPoolCreate (context, &ep_desc,
    1,
    &pDevice,
    &event_pool);
status=zeEventCreate (event_pool, &ev_desc, &kernel_event);
status=zeCommandListAppendMemoryCopy (command_list,
    hostptr,
    devptr,
    vectSize,
    kernel_event,
    0,
    nullptr);
```

Example Request Scheduling

Figure 4:
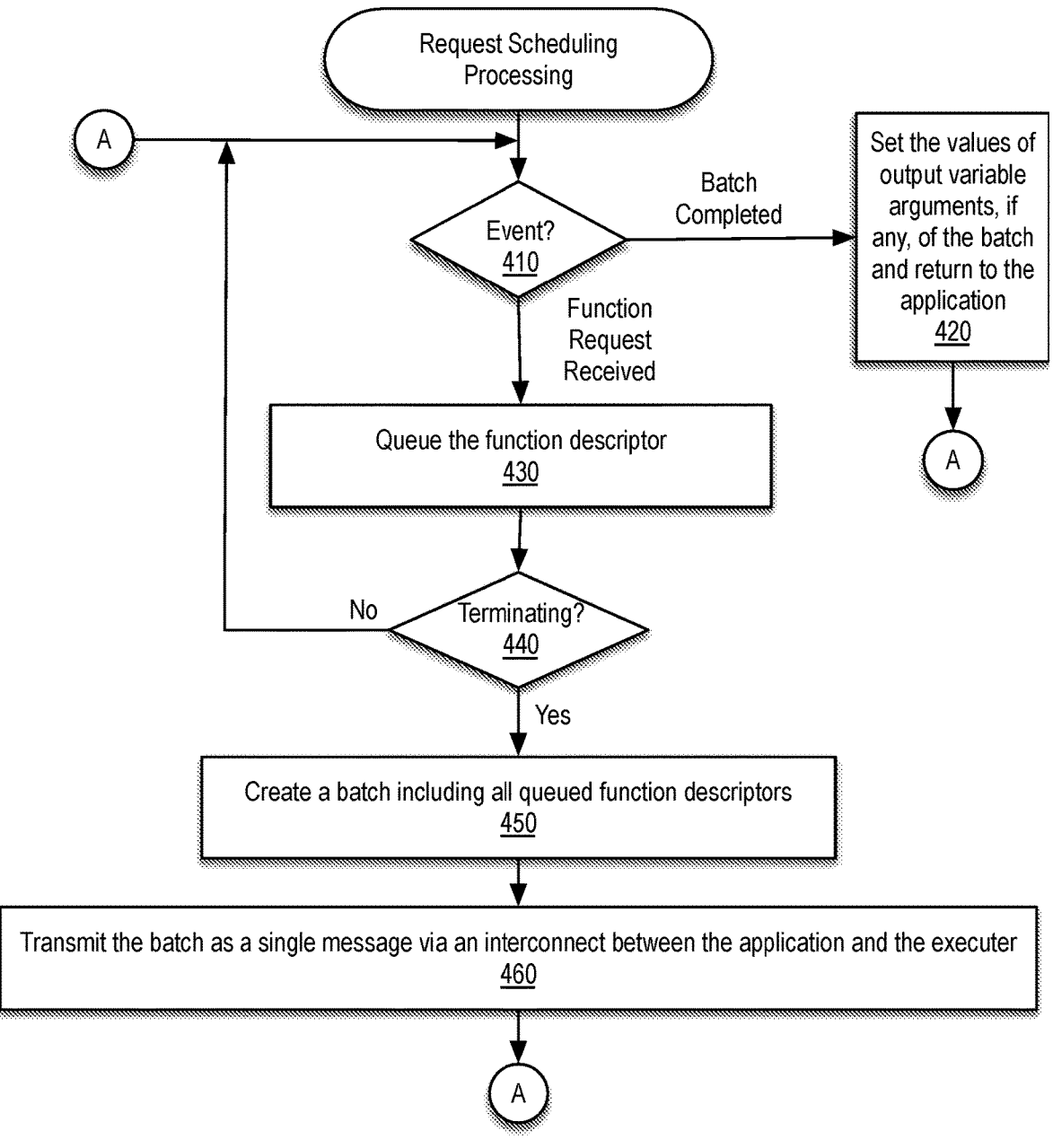
FIG. 4 is a flow diagram illustrating operations for performing request scheduling according to some embodiments.

FIG. 4 is a flow diagram illustrating operations for performing request scheduling according to some embodiments. In one embodiment, request scheduling is performed by a request scheduler (e.g., request scheduler 212) after an event is received that is indicative of completion of execution of a batch or an event that is indicative of receipt of a function request, for example, in the form of a function descriptor. A notification of completion of the batch may be sent from a service scheduler (e.g., service scheduler 232) to the request scheduler. The function request may be received directly from an application (e.g., application 211) or via an API-aware component (e.g., a library or companion optimization plug-in associated with the transactional API protocol) logically interposed between the application and the request scheduler.

At decision block 410, a determination is made regarding what the event represents. If the event represents completion of execution of all function calls associated with a previously submitted batch, processing branches to 420; otherwise, when the event represents receipt of a function request, processing continues with block 430.

At block 420, the values of output variable arguments of the completed batch are set and returned to the application. For example, the request scheduler may obtain the values of the output variable arguments of the batch from a memory manager (e.g., memory manager 240). Following block 420, request scheduling processing may loop back to decision block 410 to process the next event.

At block 430, the function descriptor is queued. For example, the request scheduler adds the function descriptor to queue 213.

At decision block 440, the function type of the function descriptor is evaluated. If the function type is terminating, indicating the function descriptor represents the end of a prescribed sequence of function calls, then processing continues with block 450; otherwise, if the function type is dependent, indicating the function descriptor represents either a start of the prescribed sequence or an intermediate step in the prescribed sequence, then processing loops back to decision block 410 to process the next event.

At block 450, a batch is created including all the queued function descriptors. In one embodiment, the batch is represented in the form of a list of function descriptors.

At block 460, the batch is transmitted as a single message via an interconnect (e.g., interconnect 220) between an application platform (e.g., application platform 210) on which the application is running and a server platform (e.g., server platform 230) including an executer (e.g., executer 231). Following block 460, request scheduling processing may loop back to decision block 410 to process the next event.

While the present example, it is assumed the application requesting thread implements a non-blocking asynchronous model, those skilled in the art will appreciate in a blocking model, the application requesting thread will block until the batch is complete.

Example Service Scheduling

Figure 5:
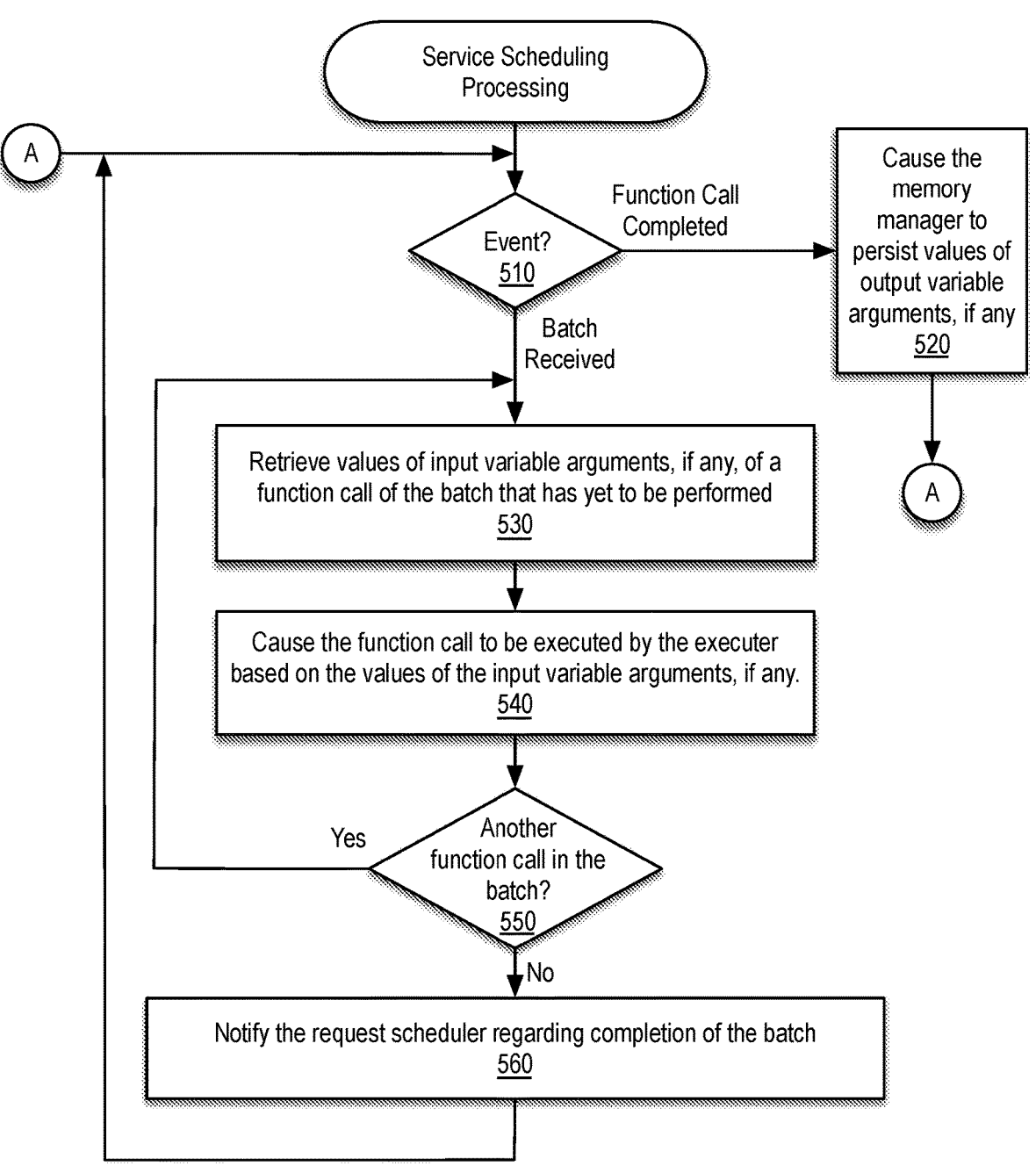
FIG. 5 is a flow diagram illustrating operations for performing service scheduling according to some embodiments.

FIG. 5 is a flow diagram illustrating operations for performing service scheduling according to some embodiments. In one embodiment, service scheduling is performed by a service scheduler (e.g., service scheduler 232) after an event is received that is indicative of receipt of a batch transmitted by a request scheduler (e.g., request scheduler 212) via an interconnect (e.g., interconnect 220) or an event that is indicative of completion of execution of a given function call by an executer (e.g., executer 231).

At decision block 510, a determination is made regarding what the event represents. If the event represents completion of execution of a given function call, processing branches to 520; otherwise, when the event represents receipt of a batch transmitted by the request scheduler, processing continues with block 530.

At block 520, a memory manager (e.g., memory manager 240) is caused to persist value of output variable arguments of the completed function call. For example, the service scheduler may process each output variable argument and cause the memory manager to set the value of the output variable argument based on the corresponding global memory reference. Following block 520, service scheduling processing may loop back to decision block 510 to process the next event.

At block 530, the values of input variable arguments of the first/next unprocessed function call of the batch of function descriptors are retrieved. For example, for a given reference argument, the service scheduler may utilize the the memory manager to acquire the value associated with the corresponding global memory reference. Input variable arguments will have the last valid value set. In one embodiment, the memory manager ensures the correctness of the data. According to one embodiment, for every reference argument, the service scheduler enables locally accessible storage be made available for that argument within a server platform (e.g., server platform 230) that includes the service scheduler and the executer.

At block 540, the given function call is caused to be executed by the executer based on the values of the input variable arguments. For example, the service scheduler may examine the function descriptor and determine the name/ID of the function to invoke. Immediate data may be passed to the executer unmodified. For reference arguments, the service scheduler may pass the values obtained in block 550. Upon conclusion of execution a function descriptor, output data represented as references will be stored via the memory manager in block 520.

At decision block 550, it is determined whether another function call remains to be processed in the batch. If so, processing loops back to block 530; otherwise, processing continues with block 560.

At block 560, the request scheduler is notified regarding completion of the batch. For example, the service scheduler may transmit the corresponding global memory reference for each output variable argument of the batch (excluding those representing intermediate data). Following block 560, service scheduling processing may loop back to decision block 510 to process the next event.

While in the context of the flow diagrams presented herein, a number of enumerated blocks are included, it is to be understood that the examples may include additional blocks before, after, and/or in between the enumerated blocks. Similarly, in some examples, one or more of the enumerated blocks may be omitted or performed in a different order.

Example Computer System

Figure 6:
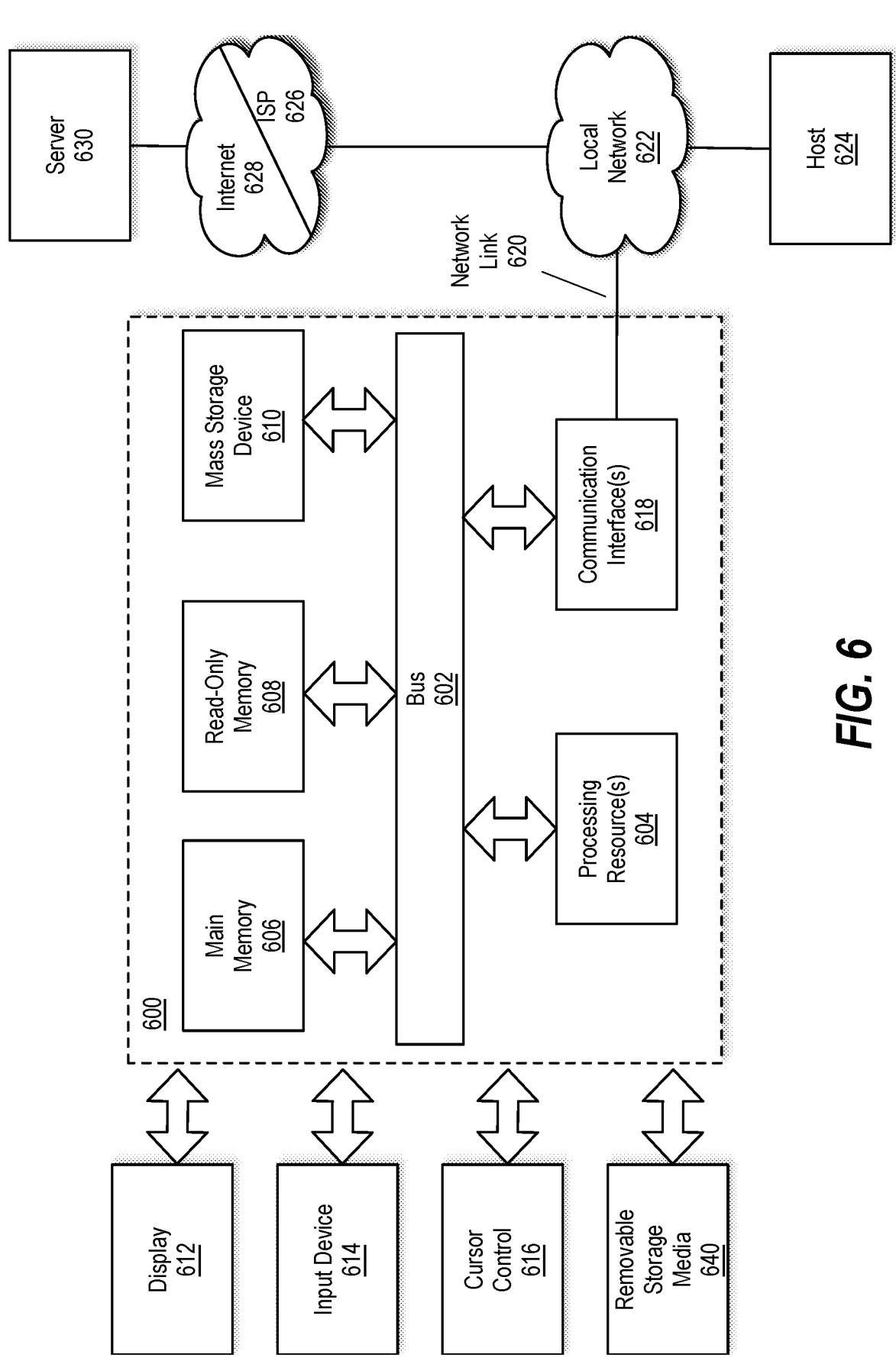
FIG. 6 is an example of a computer system with which some embodiments may be utilized.

FIG. 6 is an example of a computer system 600 with which some embodiments may be utilized. Notably, components of computer system 600 described herein are meant only to exemplify various possibilities. In no way should example computer system 600 limit the scope of the present disclosure. In the context of the present example, computer system 600 includes a bus 602 or other communication mechanism for communicating information, and one or more processing resources 604 coupled with bus 602 for processing information. The processing resources may be, for example, a combination of one or more compute resources (e.g., a microcontroller, a microprocessor, a CPU, a CPU core, a GPU, a GPU core, an ASIC, an FPGA, or the like) or a system on a chip (SoC) integrated circuit. Referring back to FIG. 2A, depending upon the particular implementation, the application platform 210 may be analogous to computer system 600 and the server platform 230 may be analogous to host 624 or server 630 or the application platform 210 may be analogous to a first compute resource of computer system 600 and the server platform 230 may be analogous to a second compute resource of computer system 600.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, e.g., a magnetic disk, optical disk or flash disk (made of flash memory chips), is provided and coupled to bus 602 for storing information and instructions.

Computer system 600 may be coupled via bus 602 to a display 612, e.g., a cathode ray tube (CRT), Liquid Crystal Display (LCD), Organic Light-Emitting Diode Display (OLED), Digital Light Processing Display (DLP) or the like, for displaying information to a computer user. An input device 614, including alphanumeric and other keys, is coupled to bus 602 for communicating information and command selections to processor 604. Another type of user input device is cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Removable storage media 640 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 600 may implement the techniques described herein using customized hard-wired logic, one or more ASICs or FPGAs, firmware or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 610. Volatile media includes dynamic memory, such as main memory 606. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes interface circuitry 618 coupled to bus 602. The interface circuitry 618 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. As such, interface 618 may couple the processing resource in communication with one or more discrete accelerators 605 (e.g., one or more XPUs).

Interface 618 may also provide a two-way data communication coupling to a network link 620 that is connected to a local network 622. For example, interface 618 may be an integrated services digital network (ISDN) card, cable modem, satellite modem, or a modem to provide a data communication connection to a corresponding type of telephone line. As another example, interface 618 may be a local area network (LAN) card to provide a data communication connection to a compatible LAN. Wireless links may also be implemented. In any such implementation, interface 618 may send and receive electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage device 610, or other non-volatile storage for later execution.

While many of the methods may be described herein in a basic form, it is to be noted that processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment." "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a non-transitory machine-readable medium storing instructions, which when executed by a processing resource of a computer system cause the processing resource to: receive a prescribed sequence of function calls that is to be carried out by an executer to perform an atomic unit of work on behalf of an application, wherein the prescribed sequence of function calls is associated with a transactional application programming interface (API); and reduce transport latency over an interconnect between the application and the executer by: creating a batch representing the prescribed sequence of function calls in a form of a list of function descriptors in which variable arguments of the prescribed sequence of function calls are represented with corresponding global memory references; and transmitting the batch via the interconnect as a single message.

Example 2 includes the subject matter of Example 1, wherein the instructions further cause the processing resource to for a given function call of the prescribed sequence of function calls: create a function descriptor for the given function call containing a function identifier (ID) of the given function call, a function type of the given function call, and the corresponding global memory references by: identifying the function type of the given function call as a dependent function type or a terminating function type; and for each of the variable arguments associated with the given function call, obtaining a corresponding global memory reference from a memory manager.

Example 3 includes the subject matter of any of Examples 1-2, wherein creation of the batch comprises: after receiving a given function descriptor of the function descriptors, placing the given function descriptor on a queue; and when the function type is the terminating function type, including within the list of function descriptors all queued function descriptors.

Example 4 includes the subject matter of any of Examples 1-3, wherein an input variable argument of the variable arguments associated with a first function call of the prescribed sequence of function calls is dependent upon an output variable argument of the variable arguments associated with a second function call of the prescribed sequence of function calls.

Example 5 includes the subject matter of any of Examples 1-4, wherein the prescribed sequence of function calls comprise remote procedure calls (RPCs).

Some embodiments pertain to Example 6 that include a method comprising: receiving a prescribed sequence of function calls that is to be carried out by an executer to perform an atomic unit of work on behalf of an application, wherein the prescribed sequence of function calls is associated with a transactional application programming interface (API); and reducing transport latency over an interconnect between the application and the executer by: creating a batch representing the prescribed sequence of function calls in a form of a list of function descriptors in which variable arguments of the prescribed sequence of function calls are replaced with corresponding global memory references; and transmitting the batch via the interconnect as a single message.

Example 7 includes the subject matter of Example 6, further comprising for a given function call of the prescribed sequence of function calls: creating a function descriptor for the given function call containing a function identifier (ID) of the given function call, a function type of the given function call, and the corresponding global memory references by: identifying the function type of the given function call as a dependent function type or a terminating function type; and for each of the variable arguments associated with the given function call, obtaining a corresponding global memory reference from a memory manager.

Example 8 includes the subject matter of any of Examples 6-7, wherein creation of the batch comprises: after receiving a given function descriptor of the function descriptors, placing the given function descriptor on a queue; and when the function type is the terminating function type, including within the list of function descriptors all queued function descriptors.

Example 9 includes the subject matter of any of Examples 6-8, further comprising after receiving the transmitted batch, for a given function descriptor of the list of function descriptors: enabling locally accessible storage for each of the variable arguments associated with the given function call identified by the function ID of the given function descriptor; and causing the executer to carry out the given function call including retrieving from the memory manager on behalf of the executer a value associated with an input variable argument associated with the given function call based on the corresponding global memory reference.

Example 10 includes the subject matter of any of Examples 6-9, further comprising after completing execution of a given function call of the prescribed sequence of function calls, causing a value associated with an output variable argument of the given function call to be persisted by providing a memory manager with the value and a global memory reference of the corresponding global memory references.

Example 11 includes the subject matter of any of Examples 6-10, further comprising after completing execution of all of the prescribed sequence of function calls, causing a value of an output variable argument of the variable arguments to be returned to the application.

Example 12 includes the subject matter of any of Examples 6-11, wherein an input variable argument of the variable arguments associated with a first function call of the prescribed sequence of function calls is dependent upon an output variable argument of the variable arguments associated with a second function call of the prescribed sequence of function calls.

Example 13 includes the subject matter of any of Examples 6-12, wherein the prescribed sequence of function calls comprise remote procedure calls (RPCs).

Some embodiments pertain to Example 14 that includes a system comprising: a first processing resource; and instructions, which when executed by the first processing resource cause the first processing resource to: receive a prescribed sequence of function calls that is to be carried out by a compute service or a second processing resource remote from the first processing resource to perform an atomic unit of work on behalf of an application associated with the first processing, wherein the prescribed sequence of function calls is associated with a transactional application programming interface (API); and reduce transport latency over an interconnect between the application and the compute service or the second processing resource by: creating a batch representing the prescribed sequence of function calls in a form of a list of function descriptors in which variable arguments of the prescribed sequence of function calls are represented with corresponding global memory references; and transmitting the batch via the interconnect as a single message.

Example 15 includes the subject matter of Example 14, wherein the instructions further cause the first processing resource to for a given function call of the prescribed sequence of function calls: create a function descriptor for the given function call containing a function identifier (ID) of the given function call, a function type of the given function call, and the corresponding global memory references by: identifying the function type of the given function call as a dependent function type or a terminating function type; and for each of the variable arguments associated with the given function call, obtaining a corresponding global memory reference from a memory manager.

Example 16 includes the subject matter of any of Examples 14-15, wherein creation of the batch comprises: after receiving a given function descriptor of the function descriptors, placing the given function descriptor on a queue; and when the function type is the terminating function type, including within the list of function descriptors all queued function descriptors.

Example 17 includes the subject matter of any of Examples 14-16, wherein an input variable argument of the variable arguments associated with a first function call of the prescribed sequence of function calls is dependent upon an output variable argument of the variable arguments associated with a second function call of the prescribed sequence of function calls.

Example 18 includes the subject matter of any of Examples 14-17, wherein the first processing resource comprises a central processing unit (CPU), a graphics processing unit (GPU), an application-specific integrated circuit (ASIC), or a field-programmable gate array (FPGA) of a first computer system.

Example 19 includes the subject matter of any of Examples 14-18, wherein the second processing resource comprises a CPU, a GPU, an ASIC, or an FPGA of a second computer system.

Example 20 includes the subject matter of Example 19, wherein the second processing resource comprises a second CPU, a second GPU, a second ASIC, or a second FPGA of the first computer system.

Some embodiments pertain to Example 21 that includes an apparatus that implements or performs a method of any of Examples 6-13.

Example 22 includes at least one machine-readable medium comprising a plurality of instructions, when executed on a computing device, implement or perform a method or realize an apparatus as described in any preceding Example.

Example 23 includes an apparatus comprising means for performing a method as claimed in any of Examples 6-13.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one non-transitory machine-readable medium having stored thereon instructions which, when executed, cause a processing resource of a computer system to:

receive a prescribed sequence of function calls that is to be carried out by an executer to perform an atomic unit of work on behalf of an application, wherein the prescribed sequence of function calls is associated with a transactional application programming interface (API); and reduce transport latency over an interconnect between the application and the executer by:

creating a batch representing the prescribed sequence of function calls in a form of a list of function descriptors in which variable arguments of the prescribed sequence of function calls are represented with corresponding global memory references; and transmitting the batch via the interconnect as a single message.

2. The non-transitory machine-readable medium of claim 1, wherein the instructions further cause the processing resource to for a given function call of the prescribed sequence of function calls:

create a function descriptor for the given function call containing a function identifier (ID) of the given function call, a function type of the given function call, and the corresponding global memory references by:

identifying the function type of the given function call as a dependent function type or a terminating function type; and for each of the variable arguments associated with the given function call, obtaining a corresponding global memory reference from a memory manager.

3. The non-transitory machine-readable medium of claim 2, wherein creation of the batch comprises:

after receiving a given function descriptor of the function descriptors, placing the given function descriptor on a queue; and when the function type is the terminating function type, including within the list of function descriptors all queued function descriptors.

4. The non-transitory machine-readable medium of claim 1, wherein an input variable argument of the variable arguments associated with a first function call of the prescribed sequence of function calls is dependent upon an output variable argument of the variable arguments associated with a second function call of the prescribed sequence of function calls.

5. The non-transitory machine-readable medium of claim 1, wherein the prescribed sequence of function calls comprise remote procedure calls (RPCs).

6. A method comprising:

receiving a prescribed sequence of function calls that is to be carried out by an executer to perform an atomic unit of work on behalf of an application, wherein the prescribed sequence of function calls is associated with a transactional application programming interface (API); and reducing transport latency over an interconnect between the application and the executer by:

creating a batch representing the prescribed sequence of function calls in a form of a list of function descriptors in which variable arguments of the prescribed sequence of function calls are replaced with corresponding global memory references; and transmitting the batch via the interconnect as a single message.

7. The method of claim 6, further comprising for a given function call of the prescribed sequence of function calls:

creating a function descriptor for the given function call containing a function identifier (ID) of the given function call, a function type of the given function call, and the corresponding global memory references by:

identifying the function type of the given function call as a dependent function type or a terminating function type; and for each of the variable arguments associated with the given function call, obtaining a corresponding global memory reference from a memory manager.

8. The method of claim 7, wherein creation of the batch comprises:

after receiving a given function descriptor of the function descriptors, placing the given function descriptor on a queue; and when the function type is the terminating function type, including within the list of function descriptors all queued function descriptors.

9. The method of claim 7, further comprising after receiving the transmitted batch, for a given function descriptor of the list of function descriptors:

enabling locally accessible storage for each of the variable arguments associated with the given function call identified by the function ID of the given function descriptor; and causing the executer to carry out the given function call including retrieving from the memory manager on behalf of the executer a value associated with an input variable argument associated with the given function call based on the corresponding global memory reference.

10. The method of claim 6, further comprising after completing execution of a given function call of the prescribed sequence of function calls, causing a value associated with an output variable argument of the given function call to be persisted by providing a memory manager with the value and a global memory reference of the corresponding global memory references.

11. The method of claim 10, further comprising after completing execution of all of the prescribed sequence of function calls, causing a value of an output variable argument of the variable arguments to be returned to the application.

12. The method of claim 6, wherein an input variable argument of the variable arguments associated with a first function call of the prescribed sequence of function calls is dependent upon an output variable argument of the variable arguments associated with a second function call of the prescribed sequence of function calls.

13. The method of claim 6, wherein the prescribed sequence of function calls comprise remote procedure calls (RPCs).

14. A system comprising:

a first processing resource; and instructions, which when executed by the first processing resource cause the first processing resource to:

receive a prescribed sequence of function calls that is to be carried out by a compute service or a second processing resource remote from the first processing resource to perform an atomic unit of work on behalf of an application associated with the first processing, wherein the prescribed sequence of function calls is associated with a transactional application programming interface (API); and reduce transport latency over an interconnect between the application and the compute service or the second processing resource by:

creating a batch representing the prescribed sequence of function calls in a form of a list of function descriptors in which variable arguments of the prescribed sequence of function calls are represented with corresponding global memory references; and transmitting the batch via the interconnect as a single message.

15. The system of claim 14, wherein the instructions further cause the first processing resource to for a given function call of the prescribed sequence of function calls:

create a function descriptor for the given function call containing a function identifier (ID) of the given function call, a function type of the given function call, and the corresponding global memory references by:

identifying the function type of the given function call as a dependent function type or a terminating function type; and for each of the variable arguments associated with the given function call, obtaining a corresponding global memory reference from a memory manager.

16. The system of claim 15, wherein creation of the batch comprises:

after receiving a given function descriptor of the function descriptors, placing the given function descriptor on a queue; and when the function type is the terminating function type, including within the list of function descriptors all queued function descriptors.

17. The system of claim 14, wherein an input variable argument of the variable arguments associated with a first function call of the prescribed sequence of function calls is dependent upon an output variable argument of the variable arguments associated with a second function call of the prescribed sequence of function calls.

18. The system of claim 14, wherein the first processing resource comprises a central processing unit (CPU), a graphics processing unit (GPU), an application-specific integrated circuit (ASIC), or a field-programmable gate array (FPGA) of a first computer system.

19. The system of claim 18, wherein the second processing resource comprises a CPU, a GPU, an ASIC, or an FPGA of a second computer system.

20. The system of claim 18, wherein the second processing resource comprises a second CPU, a second GPU, a second ASIC, or a second FPGA of the first computer system.

* * * * *